United States Patent
Khelifa et al.

[19]

[11] Patent Number: 5,938,523
[45] Date of Patent: Aug. 17, 1999

[54] DEVICE FOR REMOVING THE NOXIOUS AND AROMATIC SUBSTANCES FROM AN AIR FLOW FED INTO THE INTERIOR OF A VEHICLE

[75] Inventors: Noureddine Khelifa, Stuttgart; Guenter Abersfelder, Sindelfingen, both of Germany

[73] Assignees: Behr GmbH & Co.; Mercedes-Benz Aktiengesellschaft, both of Stuttgart, Germany

[21] Appl. No.: 08/776,650

[22] PCT Filed: Jul. 29, 1995

[86] PCT No.: PCT/EP95/03024

§ 371 Date: Feb. 7, 1997

§ 102(e) Date: Feb. 7, 1997

[87] PCT Pub. No.: WO96/05079

PCT Pub. Date: Feb. 22, 1996

[30] Foreign Application Priority Data

Aug. 8, 1994 [DE] Germany ............... 44 27 793

[51] Int. Cl.[6] .................................................. B60H 3/06
[52] U.S. Cl. ............... 454/156; 96/125; 96/127; 96/130
[58] Field of Search ............... 454/156; 96/118, 96/125, 127, 130; 62/94, 271

[56] References Cited

U.S. PATENT DOCUMENTS

| | | | |
|---|---|---|---|
| 2,248,225 | 7/1941 | Fonda | 96/130 X |
| 2,257,478 | 9/1941 | Newton | 62/94 X |
| 2,946,201 | 7/1960 | Munters | 96/125 |
| 3,263,400 | 8/1966 | Hoka et al. | 96/130 X |
| 3,368,327 | 2/1968 | Munters et al. | 96/127 X |
| 4,259,092 | 3/1981 | Matsuo et al. | 96/125 X |
| 4,290,789 | 9/1981 | Newton | 96/125 X |
| 5,222,375 | 6/1993 | Conrad et al. | 62/271 |
| 5,464,468 | 11/1995 | Tanaka et al. | 96/125 |
| 5,542,968 | 8/1996 | Belding et al. | 96/125 |
| 5,580,370 | 12/1996 | Kima et al. | 96/125 X |
| 5,620,367 | 4/1997 | Khelifa | 454/156 |
| 5,667,560 | 9/1997 | Dunne | 96/125 X |

FOREIGN PATENT DOCUMENTS

| | | | |
|---|---|---|---|
| 36 26 887 | 2/1988 | Germany | 96/127 |
| 1 211 101 | 11/1970 | United Kingdom | 96/127 |

*Primary Examiner*—Harold Joyce
*Attorney, Agent, or Firm*—Foley & Lardner

[57] ABSTRACT

A device for removing noxious and aromatic matter from a conducted air flow into the interior of a vehicle comprises an air conduction housing with a reactor containing an adsorbent. To attain consistently good adsorption and absorption power with small amounts of adsorbing and absorbing material, the air conduction housing is designed with two separate parallel air flow channels, in each of which there is a reactor in the form of a flat wall. An adsorption air flow acts upon the adsorbent in one air flow channel and a desorption air flow acts upon the adsorbent in the other air flow channel, the direction of air flow into the reactor in the adsorption operation being opposite that in the desorption operation.

26 Claims, 3 Drawing Sheets

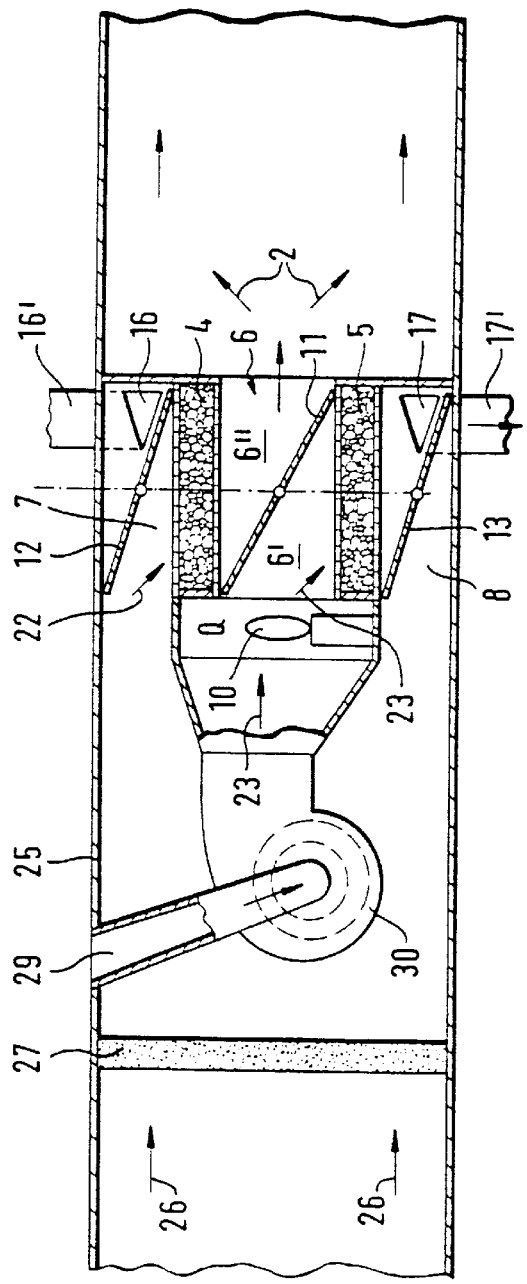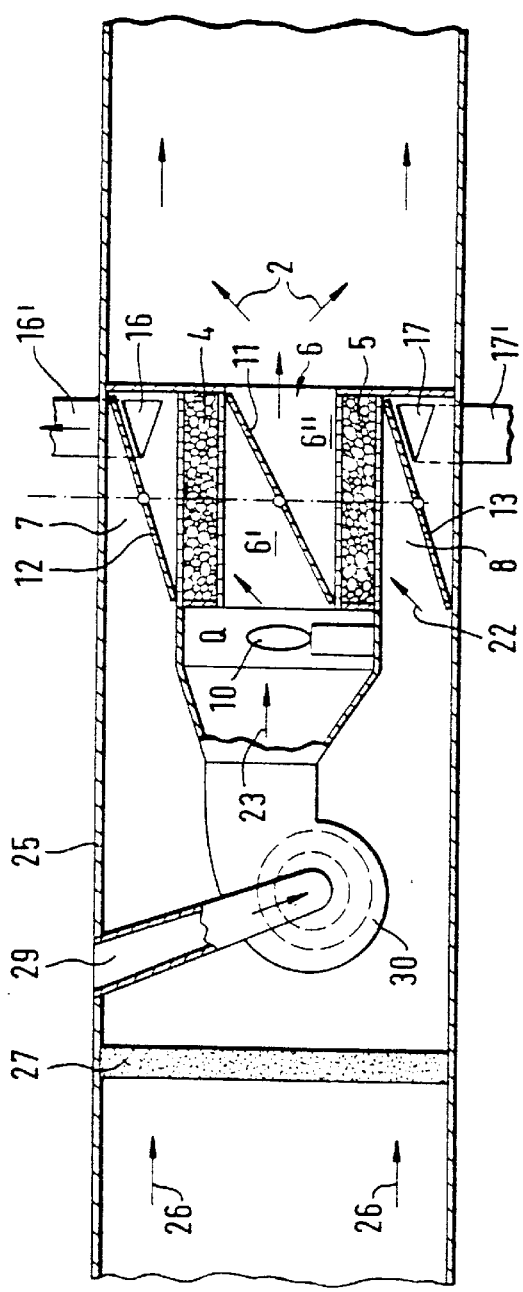

DEVICE FOR REMOVING THE NOXIOUS AND AROMATIC SUBSTANCES FROM AN AIR FLOW FED INTO THE INTERIOR OF A VEHICLE

BACKGROUND OF THE INVENTION

The invention relates to a device for removing the noxious and aromatic substances from an air flow fed into the interior of a vehicle. The device comprises an air feed housing in which at least one reactor is disposed that absorbs the noxious and aromatic substances.

DE 35 32 463 A1 discloses an air-conditioning system for a motor vehicle in which a dust filter and an odor filter are disposed in an air feed duct. Such odor filters comprise materials which absorb the aromatic substances because of their surface structure. Since the adsorption power of such filters is limited, the adsorption power decreases as time progresses and some of the substances deposited are liberated again and fed again into the interior of the vehicle by the air flow. After a specified operating time, these filter elements have to be replaced. So that the servicing intervals do not become too short, such filters have to be of appropriately large design in regard to the volume and/or the packing density, which is disadvantageous in regard to the installation space required or the pressure loss which occurs. In addition, only a few types of odorous or noxious substances are dealt with by the known filters.

DE 35 17 105 C1 describes a method for continuously removing noxious substances from a gas flow. For this purpose, a drum is provided which is filled with an absorbent, in which the gas to be purified enters through a pipe and to which there are connected two pipes through which the gas leaves. No defined air flows are formed in the drum, with the result that the exposure of the individual zones is essentially dependent on the flow resistances within the absorbent and at the outgoing pipes. Because of the bulk density in the drum, high pressure losses are produced, with the result that a high expenditure of energy is necessary to generate the gas flow. In addition, to desorb the reactor material, the gas flow component which has taken up the desorbed noxious substances has to be fed through the entire reactor to the appropriate outgoing pipe in the known arrangement.

DE 40 23 995 C2 discloses a device for fresh-air and interior-air purification in motor vehicles by means of a photocatalyst which is irradiated with photons and has a semiconductor base. To operate such a device, a mercury-vapor lamp which is attached using spring means to the catalyst bed fixed to the vehicle is required as radiation source.

DE 35 45 664 A1 describes a ventilation device for the cabin of an agricultural vehicle which comprises a fan and a plurality of filters. In this case, a first filter is designed as dust filter and a second filter as liquid trap. The third filter is a reactor for removing toxic substances in the intake air. Said filter is designed as a flat wall and is disposed in an air flow path upstream of the driver's cabin. The air-flow direction through the reactor can be reversed with the aid of multiway valves, one of the flow directions being provided for adsorption operation and the other flow direction for the desorption operation of the reactor.

SUMMARY OF THE INVENTION

The object of invention is to provide a device for removing the noxious and aromatic substances, which achieves a high degree of purity of the air fed into the interior of the vehicle and in the case of which continuous and maintenance-free operation is possible.

The essential advantages of the invention are to be seen in the fact that, of the adsorber material present in total, some of it is always disposed in the air flow to be purified as adsorber or absorber, while the rest is purified by means of a desorption air flow. In this way, a high adsorption power or absorption power is always provided, accompanied by completely maintenance-free operation. The total quantity of the adsorber material can be kept small since regenerated material is always available, and increasing contamination with operating time does not occur. The separate air flow paths result in a defined exposure of the reactor material and the design as flat wall element has the advantage that the flow resistance or the pressure drop is kept low. The opposite air-flow direction achieves the result that the section of the reactor having the greatest contamination is adjacent to the air discharge opening.

According to a preferred embodiment of the invention, the air flow paths are formed by a common main air chamber and two separate subsidiary air chambers, and each of the reactors is disposed between the main air chamber and one of the subsidiary air chambers. Air flow control elements are provided in the main air chamber and the subsidiary air chambers, by means of which air flow control elements the reactors can be alternately switched over from adsorption operation to desorption operation and vice versa. In this design, the reactor which is in adsorption operation is connected on the downstream side to the interior of the vehicle, and the reactor which is in desorption operation is connected on the downstream side to the outside of the vehicle. Such an arrangement has the advantage that the reactors are disposed in a stationary manner, the air flows being fed through the reactors alternately in accordance with specified cycles by means of the air flow control elements.

As an alternative to this, it is, however, also possible that a housing is provided which comprises a rotating reactor through which the air flow paths are fed in chambers of the housing, sectors of the reactor being moved from the adsorption air flow chamber into the desorption air flow chamber and vice versa. The air flow control elements can be omitted in the arrangement comprising a rotating reactor. A suitable drive for the reactor is, however, necessary for this purpose. Such a reactor is preferably moved in steps in accordance with a specified time cycle, in which connection the step angle may be a maximum of 180°, but preferably<90°. As an alternative to this, the reactor may be rotated continuously.

The desorption action is increased in the case of some adsorber materials if heat is supplied. It is therefore advantageous that, to desorb the adsorbent, a heating device, in particular a PTC heater or a radiator with water flowing through it, is disposed upstream of the reactor. Since the heating device is disposed upstream of the reactor and heats the desorption air flow, the desorption takes place adiabatically. At least one fan is provided to generate the necessary air flow, the total air flow leaving the fan being divided up into a desorption air flow and an adsorption air flow by suitable design. It is, however, also possible to provide a separate fan for the desorption air flow. To avoid a contamination of the absorber material by particles, particle filters of conventional design may be disposed in the air path upstream of the reactors.

Suitable as adsorber materials are active carbon, zeolite, aluminum oxide and silica gel. At the same time, it is possible that the reactor comprises a combination or mixture of at least two of these materials. The combination or mixing of different adsorbers has the advantage that the spectrum of the absorbed noxious and aromatic substances is increased. If certain adsorber materials are not suitable for mixing because of their structure, the combination of the adsorption materials can be achieved in that the various materials are disposed in layers extending transversely with respect to the air flow opening.

In particular, in reactors which comprise at least in part zeolite or silica gel, moisture is removed from the air flow in addition to the removal of noxious and aromatic substances, with the result that not only purified, but also dry air is fed into the interior of the vehicle. The moisture is also expelled from the reactor with the desorption air flow in the desorption phase.

The reactor can be designed as a monolith or bed of adsorber materials. It is also possible, however, to deposit the adsorption material on a support structure in the form of a coating, in which connection the support structure may be a heat-transfer plastic foam or a heat-transfer lattice. So that viruses and microorganisms are also removed from the air flow in addition to noxious and aromatic substances, in addition to the adsorber materials, areas are provided which have a copper-oxide or noble-metal coating. For the purpose of accelerated regeneration of the reactor in the case of heavy contamination of the adsorption material, it is expedient to provide a device for flushing the reactor by means of steam shock or a flushing gas.

BRIEF DESCRIPTION OF THE DRAWINGS

Exemplary embodiments of the device for removing the noxious and aromatic substances are explained in greater detail below by reference to the drawings. In the drawing:

FIG. 3 shows an air purification device having a desorption air stream fed in separately, FIG. 4 shows the device according to FIG. 3 in a second operating position.

Figure 1:
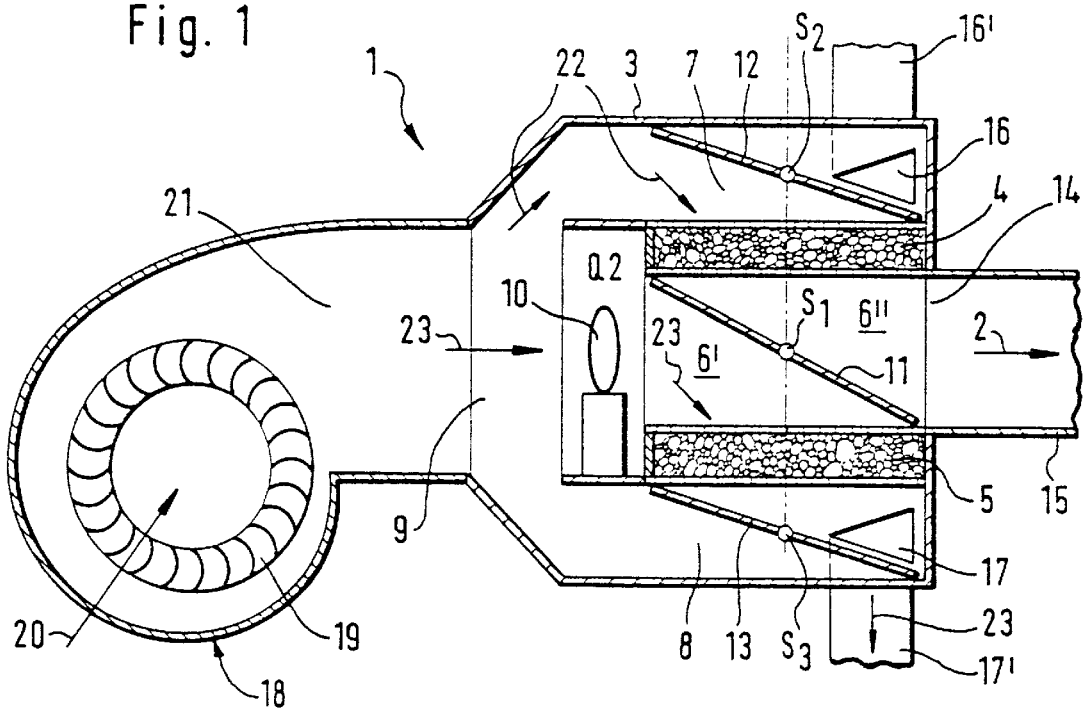
FIG. 1 shows a diagrammatic representation of an air purification device for a motor vehicle.
Figure 2:
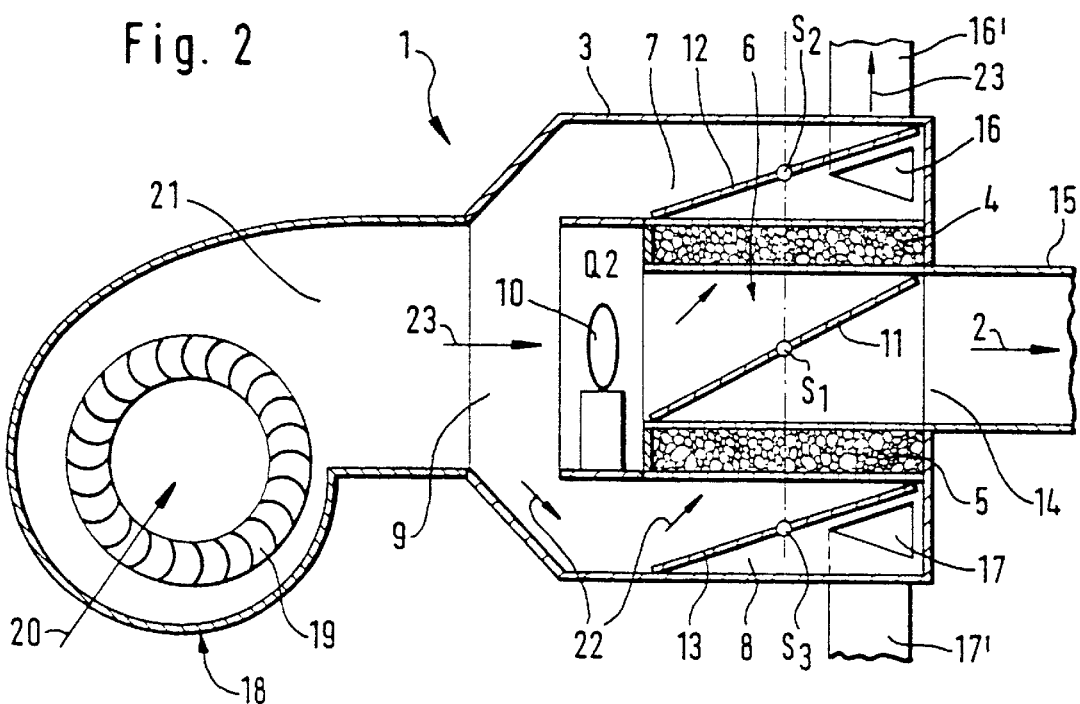
FIG. 2 shows the device according to FIG. 1 in a second operating position.

The device 1 shown in FIGS. 1 and 2 for purifying an air stream 2 fed into the interior of a vehicle comprises two reactors 4 and 5 which are disposed in a housing 3, which are disposed in parallel to one another and between which a common main air chamber 6 is formed.

The reactors 4, 5 are designed as flat wall elements, and each delineates by means of the other side a subsidiary air chambers 7 and 8 which extend in parallel to the longitudinal direction of the reactors. Each reactor 4, 5 forms an air-permeable wall between the subsidiary air chambers 7, 8 and the main air chamber 6. The main air chamber 6 and the subsidiary air chambers 7, 8 are open at their ends adjacent to an air inlet chamber 9. A heating device 10 for heating the air flow entering the main air chamber is provided at the inlet side of the main air chamber 6.

Disposed in each subsidiary air chamber 7, 8 and in the main air chamber 6 is an air control element 11, 12, 13 which is designed as a valve and which extends diagonally in the respective chamber 6, 7, 8 and can be swivelled about a swivelling axis $S_1$, $S_2$, $S_3$ in the center of the valve, with the result that the air flow control elements can be switched between the end positions determined by the diagonals of the air chambers 6, 7, 8. All the air flow control elements 11, 12, 13 are actuated simultaneously, preferably by a common drive. The air flow control valve 11 in the main air chamber 6 divides said chamber in each of the two possible positions into a front region 6' and a rear region 6". Connected to an opening 14 in the region 6" of the main air chamber 6 is an air duct 15, which is not shown in the drawing and leads to the interior of the vehicle.

In the subsidiary air chambers 7 and 8, air outlet openings 16, 17 are provided which are disposed at the ends situated remotely from the air inlet chamber and to which the air outlet ducts 16' and 17' are connected.

The air outlet openings 16, 17 can be closed depending on the position of the air flow control elements 12, 13, one of the air outlet openings always being closed and the other open.

Disposed on the housing 3 upstream of the air inlet chamber 9 is a fan 18 having a radial blower wheel 19 which sucks in air in accordance with the arrow 20 (this may be, for example, air removed from the interior of the vehicle) and generates an air flow through a diffuser 21 into the air inlet chamber 9. This air flow is divided up into an adsorption air flow 22 and a desorption air flow 23, which first flows through the heating device 10. Because of the position of the air flow control elements 11, 12 and 13 according to FIG. 1, the adsorption air flow 22 is fed through the reactor 4 and purified therein, said purification being an adsorption and/or absorption of noxious and aromatic substances. The adsorption air flow discharges from the reactor 4 into the region 6" of the main air chamber 6 and leaves the latter through the opening 14 and the air duct 15 as purified air flow 2, which is fed into the interior of the vehicle.

The desorption air flow 23 enters the region 6' of the main air chamber 6, arriving from the heating device 10, and is fed through the reactor 5 because of the position of the air flow control element 11 and picks up therein the noxious and odorous substances deposited on the surface of the adsorber material. The desorption air flow leaving the reactor 5 discharges through the outlet air opening 17 disposed in the subsidiary air chamber 8 and is discharged into the surrounding air. If the air flow control elements 11, 12 and 13 are set to the second possible position, as is shown in FIG. 2, because of the position of the air flow control elements 11, 12 and 13, the reactor 5 serves to purify the adsorption air stream 22 which enters the region 6" of the main air chamber 6 from the subsidiary air chamber 8 and is fed from there to the interior of the vehicle as purified air flow 2. At the same time, the desorption air flow 23 is fed through the reactor 4 into the subsidiary air chamber 7 and discharges through the air outlet opening 16 and the air outlet duct 16'.

The device shown in FIGS. 3 and 4 differs from the one described above in that the subsidiary air chambers 7 and 8 are not connected to the air inlet chamber 9 but are exposed to a separate air flow. The entire arrangement is disposed in an air feed duct 25 into which is fed air from the interior of the vehicle in accordance with arrows 26. A particle filter 27 is provided to remove coarse contaminants in the airstream, so that the adsorption air stream does not load the reactor 4 or 5 with dirt. An air duct 29 connected to the outside of the vehicle leads to the intake region of a fan 30, which serves solely to generate the desorption air flow 23. It is also possible to dispose a particle filter in the air duct 29 so that the dirt present in the outside air does not load the reactor. In other respects, the operation of the device is the same as that described in connection with FIGS. 1 and 2, so that reference is made to the details relating to them.

Figure 5:
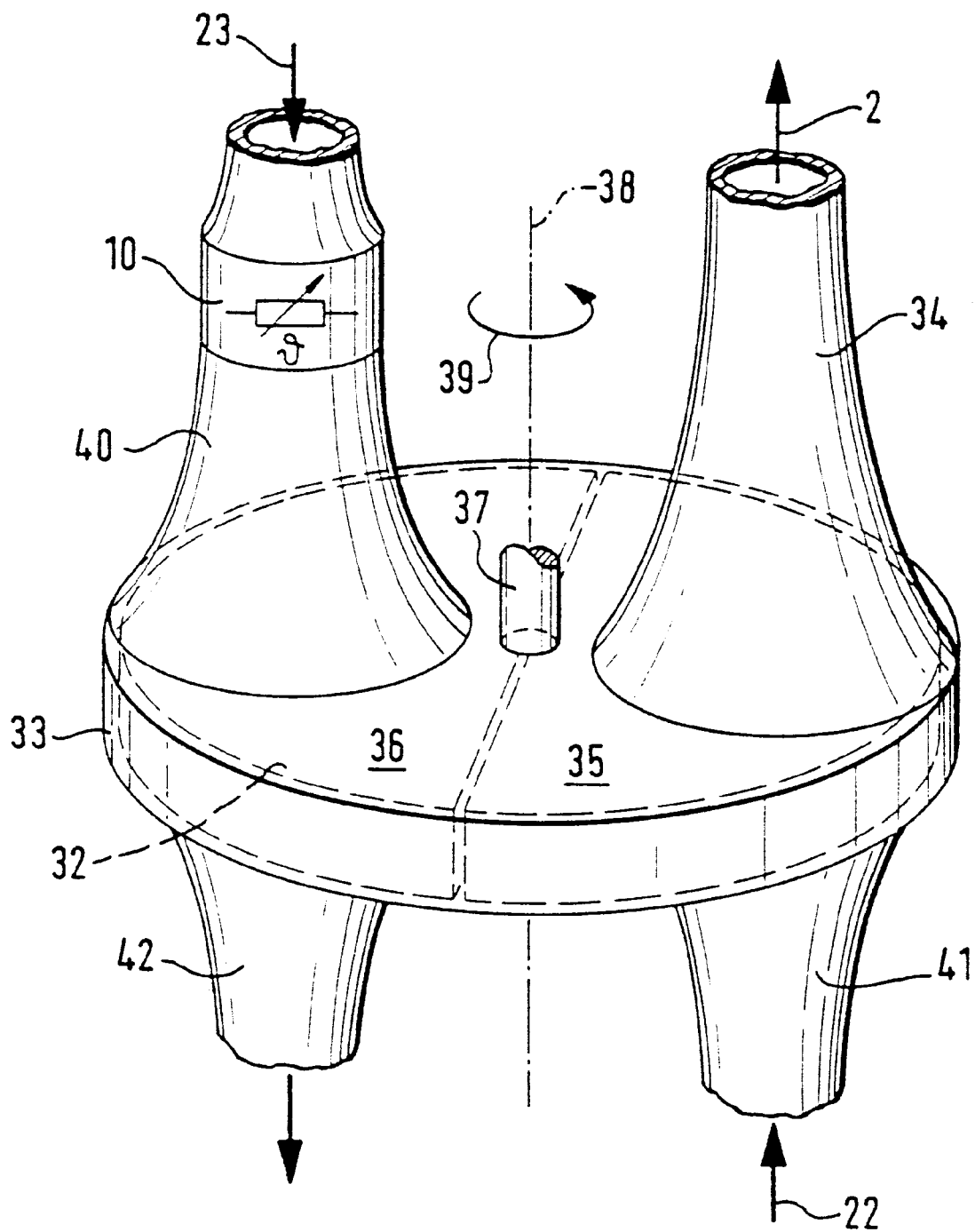
FIG. 5 shows a rotating reactor.

FIG. 5 shows a rotating reactor 32 which can be used instead of the stationary reactors 4 and 5 shown in FIGS. 3 and 4. The reactor 32, which has the shape of a disk, is disposed in a housing 33 which is subdivided into a chamber 35 for the adsorption air flow and a chamber 36 for the desorption air flow. In each chamber 35 and 36, the reactor forms an air-permeable flat wall element extending transversely with respect to the air flow direction. The reactor has a drive shaft 37 by means of which the reactor is moved around the axis of rotation 38 in the direction of the arrow 39. The adsorption air stream 22 enters the chamber through a connecting pipe piece 41 and is purified by a reactor section disposed in said chamber in order then to be fed into the interior of the vehicle through an air feed duct 34 as purified air flow 2. The desorption air flow 23 is first fed through the heating device 10 and then through a connecting pipe piece 40 of the chamber 36 for the desorption air flow. The noxious substances deposited in the adsorption material are picked up from the reactor section disposed in said chamber 36 and fed through an outlet air duct 42 into the open air.

The devices described above are able to pick up various noxious and aromatic substances depending on the type of adsorber material, the mixture or combination of various materials substantially increasing the spectrum of the types of substances eliminated. As examples of the substances to be removed mention may be made, in particular, of hydrocarbons, such as ether and benzenes, and also alcohols, hydrogen sulfides, amines, ammonia, nicotine, carboxylic acid, halides and methylene chloride. In addition, it should be specially emphasized that all the exhaust-gas constituents which vehicles discharge into the air are also filtered out by the device, as are their reaction products, of which mention should be made, in particular, of ozone. The purification of the air fed into the interior of the vehicle is an important contribution to the well-being of the vehicle passengers and, in addition, increases traffic safety since, because of the removal of moisture from the absorption air flow, dry air is fed into the interior of the vehicle and consequently condensation on the windows is avoided.

We claim:

1. A device for removing noxious and aromatic substances from an air flow fed into the interior of a motor vehicle, comprising an air feed housing of a size and configuration to fit inside of the motor vehicle, said air feed housing defining first and second separate and parallel air flow paths and having an air intake and a first air outlet adapted to deliver air to the interior of the motor vehicle;

at least one reactor positioned in each of the air flow paths, said reactor being designed as a generally planar bed member and being comprised of an adsorbent material that adsorbs both noxious and aromatic substances contained in the air; and a flow control device for alternately subjecting the adsorbent material in the first air flow path to an adsorption air flow and the adsorbent material in the second air flow path to a desorption air flow, wherein the air flow direction in the adsorbent material in the first and second air flow paths are opposite during adsorption and during desorption, wherein said air feed housing comprises a common main air chamber and two subsidiary air chambers, wherein a reactor is disposed between the main air chamber and each one of the subsidiary air chambers and wherein said flow control device includes air flow control elements provided in the main air chamber and the subsidiary air chambers for alternatively switching over between adsorption operation and desorption operation, the reactor which is in adsorption operation communicating on the downstream side with said first air outlet to the vehicle interior, and the reactor which is in desorption operation communicating on the downstream side to a second air outlet in said air feed housing that is adapted to deliver air to the outside of the vehicle.

2. A device according to claim 1, further comprising a heating device disposed upstream of the reactor.

3. A device according to claim 2, wherein said heating device comprises a PTC heater or a radiator with water flowing through it.

4. A device according to claim 1, further comprising a fan connected to the air intake of said air feed housing.

5. A device according to claim 4, wherein said air intake of said air feed housing communicates with the interior of the vehicle for withdrawing exhaust air therefrom.

6. A device according to claim 1, further comprising a fan connected to only one of said first or second air flow paths, said fan being connected to a source of air on the outside of the vehicle, and said air flow path containing said fan being connected solely to said main air chamber, for supplying desorption air flow exclusively from said outside air source via said fan.

7. A device according claim 1, further comprising a particle filter provided in at least one of said flow paths.

8. A device according claim 1, wherein the reactor is comprised of at least one adsorbent material selected from the group consisting of active carbon, zeolite, aluminum oxide and silica gel.

9. A device according to claim 8, wherein the reactor is comprised of a combination or mixture of at least two of said adsorbent materials.

10. A device according to claim 9, wherein the reactor comprises a combination of at least two materials, wherein each material is disposed in a separate layer extending transversely with respect to the air flow direction.

11. A device according to claim 1, wherein the reactor comprises a monolith or bed of adsorbent material.

12. A device according to claim 1, wherein the reactor comprises an adsorbent material coating on a substrate selected from a heat transfer medium, plastic foam or lattice.

13. A device according to claim 1, further comprising in conjunction with said reactor at least one area having a copper-oxide or noble-metal coating.

14. A device according to claim 1, further comprising a device for flushing the reactor by means of steam shock or a flushing gas.

15. A device for removing noxious and aromatic substances from an air flow fed into the interior of a motor vehicle, comprising an air feed housing of a size and configuration to fit inside of the motor vehicle, said air feed housing defining first and second separate and parallel air flow paths and having an air intake and a first air outlet adapted to deliver air to the interior of the motor vehicle;

at least one reactor positioned in each of the air flow paths, said reactor being designed as a generally planar bed member and being comprised of an adsorbent material that adsorbs both noxious and aromatic substances contained in the air; and a flow control device for alternately subjecting the adsorbent material in the first air flow path to an adsorption air flow and the adsorbent material in the second air flow path to a desorption air flow, wherein the air flow direction in the adsorbent material in the first and second air flow paths are opposite during adsorption and during desorption, wherein said at least one reactor comprises a single bed member, and said flow control device comprises a drive to rotate said bed member such that alternate areas of said bed member are alternately positioned in the first and second air flow paths.

16. A device according to claim 15, wherein said drive is adapted to rotate said bed member in steps in accordance with specified time cycles.

17. A device according to claim 15, wherein said drive is adapted to continuously rotate said bed member.

18. A device according claim 15, further comprising a particle filter provided in at least one of said flow paths.

19. A device according claim 15, wherein the reactor is comprised of at least one adsorbent material selected from the group consisting of active carbon, zeolite, aluminum oxide and silica gel.

20. A device according to claim 19, wherein the reactor is comprised of a combination or mixture of at least two of said adsorbent materials.

21. A device according to claim 20, wherein the reactor comprises a combination of at least two materials, wherein each material is disposed in a separate layer extending transversely with respect to the air flow direction.

22. A device according to claim 15, wherein the reactor comprises a monolith or bed of adsorbent material.

23. A device according to claim 15, wherein the reactor comprises an adsorbent material coating on a substrate selected from a heat transfer medium, plastic foam or lattice.

24. A device according to claim 15, further comprising in conjunction with said reactor at least one area having a copper-oxide or noble-metal coating.

25. In a motor vehicle, a device for removing noxious and aromatic substances from an air flow fed into the interior of a motor vehicle, comprising an air feed housing of a size and configuration to fit inside of the motor vehicle, said air feed housing defining first and second separate and parallel air flow paths and having an air intake and a first air outlet adapted to deliver air to the interior of the motor vehicle;

a fan connected to the air intake of said air feed housing;

at least one reactor positioned in each of the air flow paths, said reactor being designed as a generally planar bed member and being comprised of a combination of at least two adsorbent materials selected such that the reactor adsorbs both noxious and aromatic substances contained in the air; and flow control means for alternately subjecting the adsorbent material in the first air flow path to an adsorption air flow and the adsorbent material in the second air flow path to a desorption air flow, wherein the air flow direction in the adsorbent material in the first and second air flow paths are opposite during adsorption and during desorption.

26. A device according to claim 25, wherein each adsorbent material in said reactor is disposed in a separate layer extending transversely with respect to the air flow direction.

* * * * *